Aug. 6, 1935.   C. F. WAGNER   2,010,571
CONTROL MEANS FOR ELECTRICAL APPARATUS
Filed Jan. 25, 1933   3 Sheets-Sheet 1

WITNESSES:
R. J. Fitzgerald
C. F. Bryant

INVENTOR
Charles F. Wagner.
BY
Franklin E. Hardy
ATTORNEY

Aug. 6, 1935.  C. F. WAGNER  2,010,571
CONTROL MEANS FOR ELECTRICAL APPARATUS
Filed Jan. 25, 1933  3 Sheets-Sheet 2
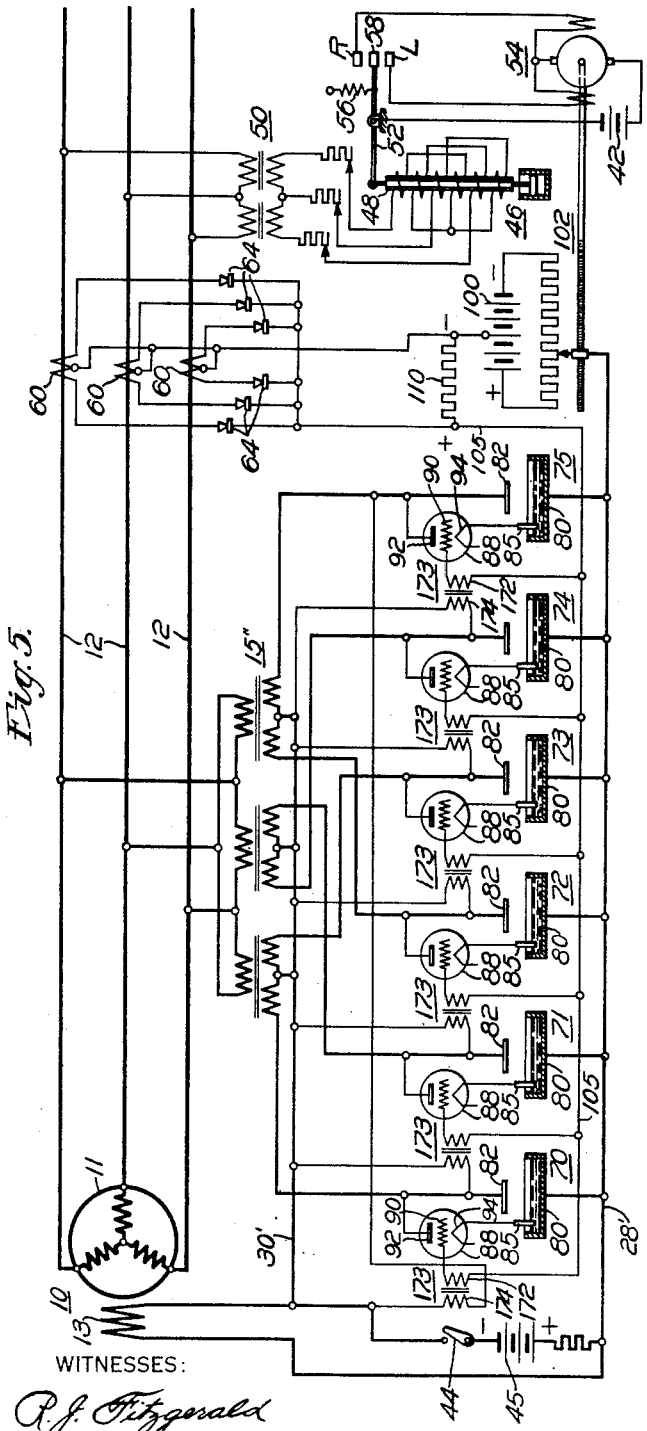
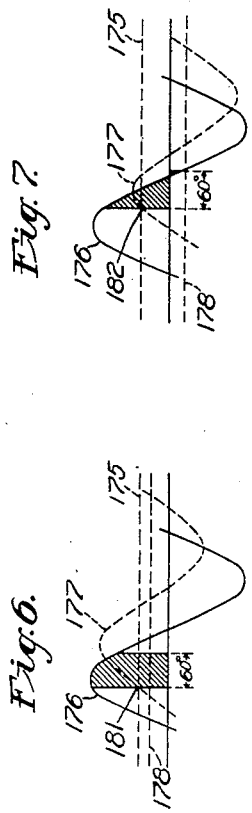
INVENTOR
Charles F. Wagner.
BY
Franklin E. Hardy
ATTORNEY Aug. 6, 1935.   C. F. WAGNER   2,010,571
CONTROL MEANS FOR ELECTRICAL APPARATUS
Filed Jan. 25, 1933   3 Sheets-Sheet 3

WITNESSES:

INVENTOR
Charles F. Wagner.
BY
Franklin E. Hardy
ATTORNEY

Patented Aug. 6, 1935

2,010,571

UNITED STATES PATENT OFFICE 2,010,571

CONTROL MEANS FOR ELECTRICAL APPARATUS

Charles F. Wagner, Swissvale, Pa., assignor to Westinghouse Electric & Manufacturing Company, East Pittsburgh, Pa., a corporation of Pennsylvania Application January 25, 1933, Serial No. 653,456

16 Claims. (Cl. 171—119)

My invention relates to electric arc devices and it has particular relation to special applications of and to improved means for controlling vapor-arc devices of the type which operate with a stationary poorly-conducting make-alive element, such as that disclosed and claimed in a copending application, Serial No. 626,866 by Joseph Slepian and Leon R. Ludwig, filed July 30, 1932 and assigned to the Westinghouse Electric and Manufacturing Company.

In that application, there is shown and described a type of vapor-arc rectifier or inverter which utilizes only one main anode element in contrast to previously used conventional types of vapor-arc rectifiers which ordinarily have a plurality of anodes, and has a make-alive element which is excited to initiate the start of each current conducting period.

Because of their unique construction, rectifiers and inverters of this newly devised type possess exceedingly broad control characteristics, it being possible, for example, to vary through a wide range the point in the positive half cycle of anode voltage at which current conduction will start. As will be apparent, such variation effects a corresponding control of the output of the rectifier or inverter.

My invention is directed to a special application of these rectifying devices in which the above-named characteristic is utilized and it additionally contemplates improved means for effecting the desired conduction control of such devices in response to a plurality of separate influences.

It is one object of my invention to provide unidirectional current to energize the field windings of dynamo-electric machines particularly those of the synchronous type, this current being derived from an alternating-current source, such as the machine terminals, through rectifiers of the above-named type.

Another object of my invention is the provision of an excitation system of the type described in which the magnitude of exciting current may readily be adjusted throughout a wide range of values.

A further object of my invention is the provision of a system of the type described in which the excitation of the dynamo-electric machine may be automatically adjusted in response to changes in one or more characteristics of the machine.

A still further object of my invention is the provision of a rectifier or inverter unit of the type under consideration which is especially adapted for output control in response to a plurality of independent influences.

In practicing my invention, I attain the first-named objects by energizing the exciting field winding of the dynamo-electric machine, through vapor-arc rectifiers of the type above described, from the alternating-current machine circuit, the make-alive elements of the rectifiers being associated with circuits appropriate for controlling the point of current conduction initiation in response to an external influence. This influence may be supplied either manually, or automatically in accordance with the variation of one or more characteristics of the machine circuit.

The last named object of my invention is achieved through the provision in the vapor-arc rectifier or inverter device of as many make-alive elements as it is desired that there be independent influences for jointly controlling the device output. Thus, instead of providing means whereby the several influences may be combined to suitably act upon the single make-alive element heretofore provided, each influence may control the vapor-arc device through a separate element, the conduction starting point of the device being determined by the element which is excited earliest in the cycle.

My invention, together with additional objects and advantages thereof will best be understood by the following description of specific embodiments when considered in conjunction with the accompanying drawings, in which Figure 1 is a diagram of apparatus and circuits illustrating vapor-arc rectifiers arranged in accordance with my invention to provide a self-excitation system for an alternating-current dynamo-electric machine, which system is adapted to effect automatic excitation adjustment in response to changes in both the voltage and load-current of the machine.

Fig. 5 is a diagram of apparatus and circuits illustrating a self-excitation system for synchronous machines in which control of the rectifiers utilized is effected through the medium of triode electronic tubes in the make-alive supply circuits.

Figure 8:
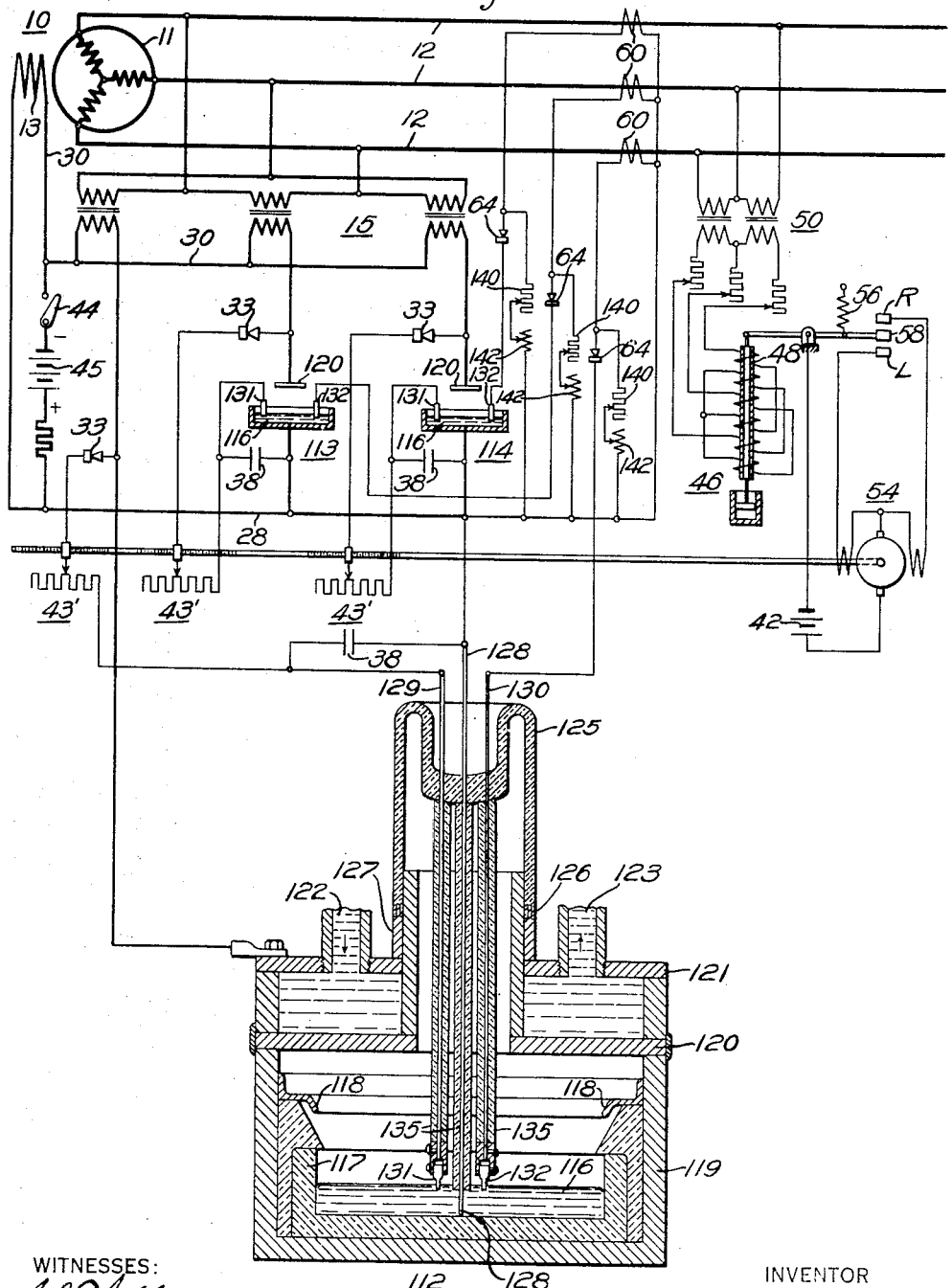

Figs. 6 and 7 are diagrams of curves showing the control characteristics of the system of Fig. 5, and Fig. 8 is a diagram of apparatus and circuits showing a preferred form of a permanently-sealed all-metal-tank vapor-arc device having a plurality of make-alive elements, as forming a part of a synchronous-machine excitation system which is adapted for automatic control in response to changes in both voltage and load current of the machine.

Figure 1:
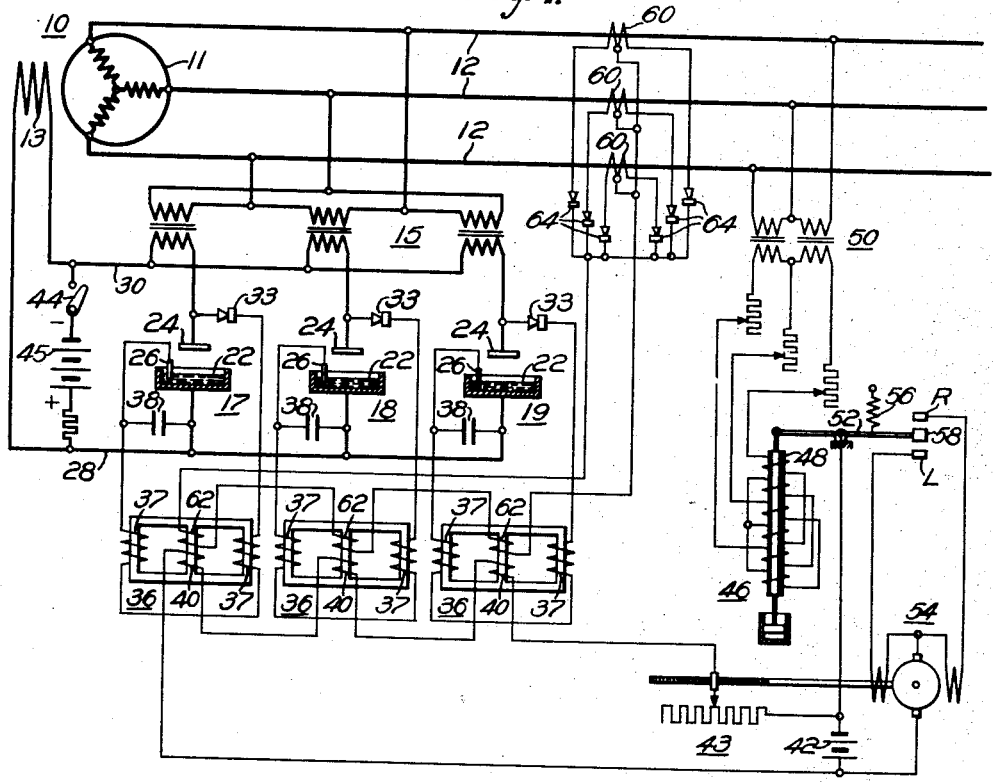

Referring to the drawings and more particularly to Fig. 1 thereof, the excitation system of my invention is shown as being applied to a dynamo-electric machine 10 which comprises armature windings 11 directly connected with the conductors of an alternating-current circuit 12, and an exciting field winding 13. The machine 10 is illustrated as being of the three-phase synchronous type, but it will be apparent that the excitation system about to be described is also applicable to alternating-current machines having a different number of phases, and to direct-current machines for which an alternating-current excitation source is available.

The field winding 13 is supplied with energizing current from circuit conductors 12 through a bank of delta-star connected transformers 15 in the secondary-winding circuits of which vapor-arc rectifiers 17, 18 and 19 are connected in the manner shown. These vapor-arc rectifiers may be any one of a number of different types, the physical constructions of several of which are more completely illustrated and described in the previously mentioned copending application, Serial No. 626,866. As indicated in Fig. 1, each rectifier comprises a cathode element 22, preferably in the form of a pool of mercury or other vaporizable reconstructing material, and an anode element 24 positioned thereabove. In contact with the cathode is disposed a make-alive element 26 of carborundum crystal or other poorly-conducting material more completely described in the copending application above referred to.

In the connection illustrated in Fig. 1, the cathode elements 22 of the three rectifiers are all connected to a common bus 28 to which one end of machine field winding 13 is joined, the anode elements 24 of the rectifiers being respectively connected to the free ends of the star-connected secondary windings in transformer bank 15, the neutral point of this star connection comprising conductor 30 to which the other end of machine field winding 13 is connected.

In a rectifier of the above-described vapor-arc type, current conduction between the anode and cathode elements can take place only when the make-alive element is made active to liberate ions and electrons from the cathode material. Consequently, until an energizing current is applied to the make-alive element, each of the rectifiers shown in Fig. 1 will act as an insulator during both the positive and negative half cycles of anode voltage. The passage of a suitable current through the make-alive element 26 effects the necessary ionic liberation from the cathode material to strike an arc between the major elements 24 and 22, which arc will continuously sustain current conduction until, in the polyphase apparatus shown, the rectifier in the next phase in sequence becomes conducting. For a three phase system, each rectifier is thus conductive for 120 electrical degrees during each complete cycle.

To ensure that the make-alive element will be excited only during the positive half-cycles of anode voltage, the exciting potential may be supplied from the major-element circuit of the rectifier through the medium of a small auxiliary rectifier. Such rectifiers 33 are connected in the make-alive circuits of the vapor-arc devices in the manner shown in Fig. 1. These rectifiers, which may be either of the two element electronic-tube type or the equally well known rectox type, effectively block off current conduction through the make-alive element when the device anode is negative with respect to the cathode, permitting passage and attending conduction by the major elements of the device only during the positive half cycle of anode voltage. Consequently, in the system shown in Fig. 1, the machine field winding 13 will be energized by a three phase rectified current which possesses the required unidirectional characteristics.

In order that the voltage of machine 10, which for the time being may be assumed to be a generator, may properly build up during the starting period, an auxiliary source of direct current excitation shown as a battery 45 may, if required, be utilized. In such a case, the battery switch 44 would be closed only at the beginning of the starting operation, it being opened as soon as the machine voltage attained an appreciable value.

Figure 2:
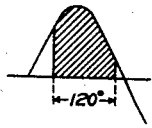
Figs. 2 and 3 are curves showing how effective-current output of a vapor-arc rectifier may be varied.
Figure 3:
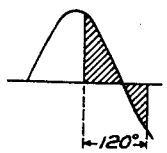

In order that the magnitude or effective value of this rectified current may be controlled, means for varying the make-alive potential may be utilized. As illustrated, such means comprise saturable core reactors 36 having impedor windings 37 connected in the make-alive supply circuits. To modify the effect of the impedance of the windings 37, capacitors 38 may, if desired, be employed connected between the make-alive and cathode elements of the rectifiers. The impedors 37 and capacitors 38 cause the make-alive elements 26 to be influenced by a potential that is delayed with respect to that acting upon the rectifier anode, and current conduction from the anode to the cathode is correspondingly delayed to an intermediate point in the positive half cycle. As illustrated in Figs. 2 and 3 in which the shaded areas of the anode voltage waves there shown indicate current conduction periods for early and late make-alive actions respectively, the magnitude of this delay determines the effective value of current supplied by the vapor-arc devices to the machine field winding 13.

It will be noted that for the early make-alive action depicted in Fig. 2, all of the 120° conduction period occurs during the positive half cycle of anode voltage, while for the later make-alive action of Fig. 3, the period includes a portion of the negative half cycle. Thus, for the condition of conduction initiation shown in Fig. 2 the effective value of direct-current supplied by the vapor-arc devices is much greater than when conduction initiation is delayed to correspond to the condition of Fig. 3.

To control this delay, means for varying the impedance of windings 37 may be utilized. In the system of Fig. 1 such means comprise reactor core saturating windings 40 energized from a direct-current source 42 through a current-controlling rheostat 43. An increase in saturating winding current serves to reduce, in well known manner, the impedance of windings 37 which causes the make-alive elements of the rectifiers to function at an earlier point in the positive half cycles of anode voltage and thereby increases the excitation of machine 10.

Assuming that the machine is a generator suitably driven at substantially constant speed by mechanical means (not shown), such an increase in excitation raises the voltage applied to circuit conductors 12. Consequently, an adjustment of rheostat 43 in the current-raising direction serves to raise the voltage of machine 10, while adjustment in the current-lowering direction correspondingly lowers the machine voltage.

The rheostat 43 may be operated either manually or, as shown, it may be adapted for automatic control by regulating equipment 46. As illustrated, equipment 46 is of the voltage responsive type, it comprising a plunger 48 with which is associated a plurality of interconnected windings which are energized through potential transformers 50 by the voltages acting in circuit 12. The solenoid element of the regulator is the same as that shown and described in a copending application, Serial No. 572,066 by myself, filed October 30, 1931 and assigned to the same assignee as this invention. An upwardly acting force, directly proportional to the three-phase voltage acting in circuit 12, is exerted upon core element 48, to control the position of a contact-carrying member 52 to control the energization of a rheostat-adjusting motor 54.

When the voltage of machine 10 falls below a predetermined desired value for which the equipment may be set to maintain, a tension spring 56 effects an engagement of contact members 58 and R to energize motor 54 in a direction to decrease the resistance of rheostat 43 and thus raise the saturation of reactors 36. As a result, the output of rectifiers 17, 18 and 19 is correspondingly increased and the excitation of machine 10 increased in a manner to bring the machine voltage back to the desired value.

Similarly, in the event that the voltage of the machine increases above its desired value, the increased pull on regulator plunger 48 effects the closure of contact members 58 and L, thereby energizing rheostat-operating motor 54 in the rheostat-resistance-raising direction. This decreases the saturation of reactors 36 and by correspondingly decreasing the output of rectifiers 17, 18 and 19 effects a reduction in the excitation of machine 10 appropriate to effect the necessary lowering correction of machine voltage.

In order to meet the requirements of stability, which are peculiar to alternating-current systems involving interconnected synchronous machines of which the illustrated machine 10 may be assumed to be one, I provide additional means influenced by changes in machine loading, which are exceedingly rapid for directly acting upon the rectifier control circuits. In Fig. 1, such means are illustrated as current transformers 60 inserted in circuit conductors 12, and energize an additional set of saturating windings 62 on the reactors 36 through suitable low-capacity or auxiliary rectifiers 64.

Upon the occurrence of a rapid increase in load on the machine 10, these current transformers act to saturate the reactors 36 to effect an increase in the output of the rectifiers 17, 18 and 19 and, consequently an increase in the excitation of the machine 10, this action taking place with practically no delay and hence serving to greatly improve system stability. In a similar manner, a decrease in machine loading will be seen to directly produce a decrease in machine excitation.

The automatic regulating system shown in Fig. 1 being thus independently responsive to both the voltage and the load current of the synchronous machine, is found to give exceedingly satisfactory performance, it possessing all the requisites of quick-response excitation, the advantages of which are well recognized. The provision of a source of machine excitation derived from the main alternating-current circuit through the medium of the special vapor-arc rectifiers illustrated, effects a marked saving in cost of the complete equipment, since the heretofore necessary direct-current exciting generator is eliminated thereby.

In the system of Fig. 1 just described, the exciting potentials for the make-alive elements of rectifiers 17, 18 and 19 are derived directly from the main anode circuits of the rectifiers. The auxiliary rectifying devices utilized to block off the flow of current to the make-alive elements during the negative half cycles of anode voltage are disposed in series relation with the make-alive circuits. Other arrangements for accomplishing similar results are possible, as shown in Fig. 4 which is a reproduction of a portion of the system in Fig. 1, in which certain modifications have been made.

Figure 4:
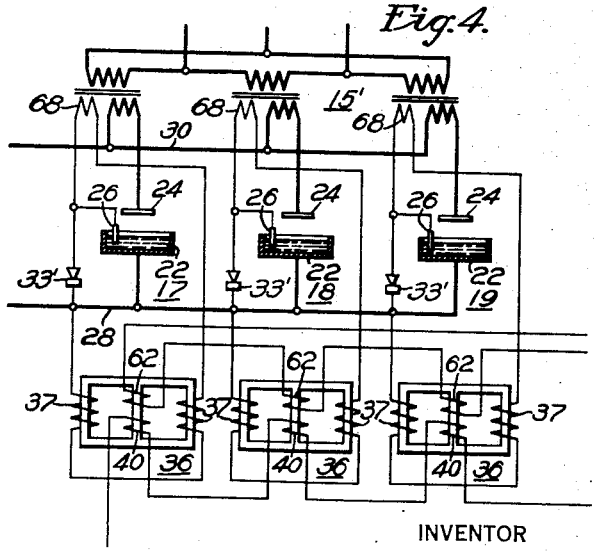
Fig. 4 is a reproduction of a portion of the system shown in Fig. 1 in which a second form of arc-device make-alive voltage supply is illustrated.

In Fig. 4, the voltages applied to the make-alive element are supplied from auxiliary secondary windings 68 in the bank of transformers 15'. These windings serve to energize the make-alive elements 26 through circuits which include impedor windings 37 of reactors 36 in a manner similar to that shown in Fig. 1. However, instead of connecting the auxiliary rectifiers in series circuit relation, they are connected, as shown at 33', in parallel circuit relation to the make-alive and the anode elements of the main rectifiers.

In the operation of the system of Fig. 4, the polarity of the make-alive potential is such with respect to the main rectifier voltage that, when the anode voltage is negative, the make-alive voltage will have such a direction that a by-pass current will be conducted by rectifiers 33' to shunt away from the direct make-alive to the cathode element path the current which would otherwise flow therein and liberate sufficient ions to establish a current-carrying arc between the main elements of the rectifier.

However, when the rectifier anode is positive with respect to the cathode, the voltage impressed upon the make-alive element circuit is of such polarity that the auxiliary rectifier 33' is ineffective as a by-pass conductor and current flows directly from the cathode to the make-alive element, establishing a current-carrying arc from the anode to the cathode. Since the effect of changing the impedance of the reactor windings 37 is the same as that already explained in detail in connection with Fig. 1, namely, to change the output or effective conductivity of the main rectifiers, no further discussion thereof is deemed necessary.

In Fig. 5, a somewhat different form of rectifier control is illustrated, which control is essentially the same as that disclosed in Fig. 6 of the before-identified copending application Serial No. 626,866. As in the case of Figs. 1 and 2, the system with which the control is shown is disposed to supply an exciting current to field winding 13 from the alternating current terminals of a synchronous machine 10. As illustrated, six rectifiers of the type already described may be utilized in this exciting current circuit, instead of three. These rectifiers, designated by reference characters 70 to 75 inclusive, are supplied with current from a bank of transformers 15'', the primary windings of which are delta connected to circuit conductors 12, and the secondary windings of which are diametrically connected to constitute, in effect, a total of six phases, each one of which corresponds to one of the six rectifiers. In this circuit, all six of the cathodes 80 are connected to a bus or conductor 28', which is connected to one side of machine field winding 13, and the six rectifier anodes 82 are respectively connected to the six phase terminals of the transformer bank 15", the three neutral conductors of the diametrical arrangement being connected with conductor 30' to which the other end of machine field winding 13 is connected.

The make-alive elements 85 of the six vapor-arc rectifiers are connected to their respective anode leads through three-element rectifier tubes 88 which are provided with grids 90, the tubes being what are known as positive control tubes needing about 30 volts positive bias in order to make the arc strike between the plate or anode 92 and the filamentary cathode 94.

The biasing voltage applied to the grids 90 of the small rectifier tubes in the make-alive circuits is supplied from a variable direct-current source, such as a battery 100 through a potentiometer resistor 102 that is connected between the main cathode bus 28' and a grid control bus 105, the voltage being variable from about 30 volts positive to about 30 volts negative applied to the grid control bus 105 with reference to the main cathode bus 28' of the main rectifiers.

The controlling grid 90 of the small make-alive circuit rectifier of each main rectifier is energized from the secondary winding 172 of a small transformer 173, the primary winding 174 of which is energized from the next leading phase of the six phase windings of the transformer bank 15", the secondary winding 172 being connected between grid 90 and the grid-control bus 105. The six transformers 173 may be very small since the grid control currents are of the order of a few milliamperes.

The operation of the grid control circuits is illustrated in Figs. 6 and 7 in which the horizontal line 175 represents the biasing voltage necessary to be applied to the auxiliary rectifier tubes 88 before they will begin to operate and supply current to the anodes 85 of their respective main rectifiers. The portions of the alternating voltages applied to the main anodes 82 where these voltages are positive with respect to the cathode bus, are shown by the full line curves 176 in Figs. 6 and 7. The voltage developed in the secondary winding 172 of the small grid transformer 173 is represented by the dotted-line sinusoidal curve 177 having for its base line the voltage of the biasing resistor 102, represented by the dotted horizontal line 178.

By changing the value of the biasing voltage (line 178) from a given positive potential, shown in Fig. 6, through zero, to the value of negative potential shown in Fig. 7, the point at which the grid curve 177 crosses the horizontal line 175 representing the voltage necessary to be applied to the grid 90, before its auxiliary rectifier tube 88 will operate, is retarded as indicated by the points 181 and 182 in Figs. 6 and 7 respectively, so that the arc between the main anode 82 and the cathode 80 of the several main rectifiers 70 struck later and later in the half cycle in which the main anode is positive thereby reducing the power transferred to the machine exciting winding 13, as indicated by the shaded areas in Figs. 6 and 7, each of which areas is, for the six-phase system shown, 60° in width. In this manner, the current supplied to winding 13 may be changed throughout a relatively wide range.

By combining the potentiometer device 102 with automatic regulating equipment 46, the system of control just described may be made to regulate the excitation of machine 10 in a manner to maintain the voltage of circuit 12 constant. A decrease in the generator voltage below a normal desired value causes the completion of an energizing circuit through the contact member R of the regulator to the potentiometer operating motor 54, which actuates the potentiometer 102 in a direction to increase the positive bias impressed upon grid bus 105 and thereby increase the effective conductivity of the tubes 88 and, hence, the current supplied to the generator field winding 13. The generator voltage is thus increased to its desired value.

In a similar manner, when the generator voltage increases above its normal value, the motor 54 is energized by a circuit through the contact member L to operate in a direction to decrease the positive potential applied to grid bus 105 with the result that the output of the main rectifiers and, hence, the current supplied to the machine field winding 13 is decreased, and the machine voltage appropriately lowered.

To incorporate with the system of Fig. 5 the load-current-responsive excitation-control feature described in connection with Fig. 1, I introduce into the grid bias circuit before mentioned a resistor 110 which has impressed thereon a direct-current potential which is proportional to the current flowing through conductors 12 and influencing current transformers 60 disposed therein. The polarity of this potential is such that the bias of the grid bus 105 with respect to main cathode bus 28' is made more positive as the machine loading is increased, with the result that the machine excitation will be correspondingly raised. It will be appreciated that in a system of the type illustrated in Fig. 5, the excitation adjustment in response to load current change is exceedingly rapid, it being comparable to the compensating expedient shown and described in connection with the system of Fig. 1.

Instead of combining a plurality of separate control influences to jointly act upon a single make-alive element in a vapor-arc device, I further contemplate the provision of a plurality of make-alive elements in each device, each element of which individually accommodates a separate controlling influence. Such a modified form of device construction is illustrated in Fig. 8, in which an excitation system for a synchronous machine of the general type previously described is shown.

In Fig. 8, each of the vapor-arc rectifiers 112, 113 and 114, utilized in the machine field winding circuit, is shown as being of the multiple make-alive element type. The device 112, for example, is illustrated as consisting of a permanently-sealed evacuated container composed substantially entirely of metal such as iron, all portions of said metal being in electrical contact with each other. A cathode 116 of mercury or other vaporizable reconstructing material is disposed in a dish or receptacle 117 of quartz or other insulating material disposed in the bottom of the tank. The quartz or other insulation between the mercury cathode and the tank should be of a type which is not easily bridged by dirt or mercury particles and to this end, it is preferably surmounted by a steel guard ring 118 which keeps mercury off from a portion of its surface.

For convenience in construction, the metal tank will ordinarily be made in several parts, which can be separately prepared and subsequently assembled and welded together. As shown in the drawings, this tank consists of a cup-shaped base portion 119 which contains the cathode receptacle 117 and the guard ring 118. To the top of this base portion 119 is welded a main iron anode 120 having a flat bottom surface spaced a short distance from the surface of the mercury cathode.

To provide cooling of the main anode element, a water jacket 121 is provided on top thereof for the purpose of receiving cooling water from a suitable connection 122, discharge of this water being made through a similar connection 123. In the application under consideration, it is preferable to operate the rectifier at a relatively low temperature to insure a more rapid disappearance of the ions and electrons in the conducting space between the positive and negative half cycles of anode voltage.

The main anode 120 which constitutes the top of the tank is provided with a central opening in which is sealed an insulator of any suitable type, the same being shown in Fig. 8 as a glass member 125 which is sealed with a glass seal 126 to a nickel-plated copper ring 127, the lower end of which is brazed to the main anode. The glass or other insulator 125 has sealed therein a tungsten cathode lead 128, which extends down centrally through the device into contact with the mercury cathode 116, and two make-alive element leads 129 and 130 which support at their lower ends make-alive rods 131 and 132 respectively, of poorly conducting material, such as carborundum crystal or the like. These make-alive members are positioned so that their lower ends are immersed in the liquid mercury cathode 116 and stay immersed throughout operating conditions. Preferably, all three of the tungsten leads 128, 129 and 130 are surrounded by means of suitable insulating tubes 135 in the manner shown.

It will be appreciated that types of mechanical constructions other than the one just described may be utilized for vapor-arc devices having more than one make-alive element, the one illustrated in Fig. 8 being intended to represent only one of the several forms of construction which are possible and which, in part, are described in greater detail in the previously mentioned copending application, Serial No. 628,866.

Vapor-arc devices 113 and 114 are represented in diagrammatic form only, they too comprising the two make-alive elements 131 and 132 in addition to the anode and cathode elements 120 and 116. In the particular automatically controlled excitation system illustrated in Fig. 8, make-alive elements 131 are influenced by the voltage of machine 10, while elements 132 are influenced by the load current of the machine. The manner of control of elements 131 is essentially the same as that shown and described in connection with the system of Fig. 1. In Fig. 8, however, the saturable core reactors are replaced by rheostats 43' directly operated by motor 54, the function of these adjustable impedance devices in the make-alive element excitation circuits being to control the point in the cycle at which the element becomes effective to render the rectifier conductive.

The current-responsive make-alive elements 132 are illustrated as being influenced by current transformers 60, associated with main-circuit conductors 12, through circuits which include rectifiers 64. To vary the responsiveness of these make-alive elements, shunting impedances comprising adjustable resistors 140 and adjustable reactors 142 are associated with the element-excitation circuits in the manner shown. Each element is acted upon only by the current flowing in one of the conductors 12 and in the particular connection illustrated this current is in phase with the voltage acting upon the corresponding rectifiers when machine 10 supplies a load at zero power factor. The impedance offered by resistors 140 and reactors 142 is such that for normal loading of machine 10, the current flow through the make-alive elements 132 will not build up to a sufficient magnitude to start a conducting arc in the rectifiers. It should be pointed out that in many applications the adjustable reactors 142 may be dispensed with, as will later become evident.

It will be apparent that in a vapor-arc device utilizing a plurality of make-alive elements, as does that illustrated in Fig. 8, the element which first strikes an arc in each positive half cycle of anode voltage is the one which controls the device, since once the arc has been struck, current conduction between the major elements will continue throughout the remainder of that half cycle, or in a polyphase system, until the rectifier next in sequence becomes conducting.

Therefore, in operation of the complete system shown in Fig. 8, normal loading of machine 10 permits only the voltage-influenced make-alive elements 131 to control the major excitation. However, upon the occurrence of sudden excess loading of the machine, as for example, a three-phase short circuit (which is almost zero power factor), the current influenced make-alive elements 132 receive a critical value of current sufficiently early in the cycle to strike an arc in advance of that struck by the voltage influenced elements 131 and, therefore, act directly to appropriately increase the excitation of machine 10. Abnormal loading conditions having subsided, the current-influenced make-alive elements 132 cease to govern the machine excitation, control being restored to the voltage-influenced elements 131.

By adjusting devices 140 and 142 to change the resistance and reactance components of the impedance in the current-element circuits, the phase position and value of the rectified current impressed upon the elements may be altered to vary the magnitude and power factor of machine load current required to render the elements effective. It will be apparent, furthermore, that connections other than the one illustrated may be utilized to accomplish the equivalent or other desired results.

It will be evident that while I have illustrated a vapor-arc device having only two make-alive elements and shown it in combination with a system in which only two independent control influences are present, devices having a greater number of make-alive elements may readily be constructed and will find ready application in a number of situations comparable to the one considered in this application.

Although I have shown and described certain specific embodiments of my invention, I am fully aware that many modifications thereof are possible. My invention therefore, is not to be restricted except insofar as is necessitated by the prior art and by the spirit of the appended claims.

I claim as my invention:

1. In a self-excitation system for an alternating-current dynamo-electric machine having a field winding, the combination of a vapor-arc device having a make-alive element which when excited renders the device conductive, a circuit for connecting the field winding to said machine through said vapor-arc device, means for exciting said make-alive element only during alternate half cycles of the machine voltage, and means for adjusting, in accordance with variations in a characteristic of said alternating-current machine, the point in the said half cycles at which the said make-alive element excitation becomes effective.

2. In a self-excitation system for an alternating-current dynamo-electric machine having a field winding, the combination of a vapor-arc device having a make-alive element which when excited renders the device conductive, a circuit for connecting the field winding to said machine through said vapor-arc device, a circuit for impressing, only during alternate half cycles of machine voltage, an exciting potential upon said make-alive element, and an adjustable impedance device disposed in said last named circuit for varying the character of said potential.

3. In a self-excitation system for a dynamo-electric machine having a field winding, the combination of a vapor-arc current-rectifying device, having a make-alive element, connected intermediate the machine and the winding, a circuit influenced by the machine voltage for supplying an exciting current to said make-alive element, a rectifier disposed in said circuit to block off the exciting current during alternate half cycles of power source voltage, and an adjustable impedance also disposed in said circuit to vary the character of the said exciting current for the purpose of controlling the magnitude of field winding energizing current.

4. In a self-excitation system for an alternating-current dynamo-electric machine having a field winding, the combination of a current-rectifying and controlling device, connected intermediate the machine and the winding, said device being of the vapor-arc type having a make-alive element, a circuit influenced by the machine voltage for supplying an exciting current to said element during alternate half cycles of said voltage, a saturable-core reactor having an impedor winding disposed in said circuit and a core-saturating winding, and means for energizing said saturating winding by a unidirectional current of adjustable magnitude.

5. In a self-excitation system for an alternating-current dynamo-electric machine having a field winding, the combination of a current-rectifying and controlling device, connected intermediate the machine and the winding, said device being of the vapor-arc type having a make-alive element, a circuit influenced by the machine voltage for supplying an exciting current to said element during alternate half cycles of said voltage, a saturable-core reactor having an impedor winding disposed in said circuit and a core-saturating winding, and means for energizing said saturating winding by a unidirectional current the magnitude of which varies in accordance with changes in a characteristic of said alternating-current machine.

6. In a self-excitation system for an alternating-current dynamo-electric machine having a field winding, the combination of a current-rectifying and controlling device, connected intermediate the machine and the winding, said device being of the vapor-arc type having a make-alive element, a circuit influenced by the machine voltage for supplying an exciting current to said element during alternate half cycles of said voltage, a saturable-core reactor having an impedor winding disposed in said circuit and a core-saturating winding, and means for energizing said saturating winding by a unidirectional current, the magnitude of which varies in accordance with the voltage of said alternating-current machine.

7. In a self-excitation system for an alternating-current dynamo-electric machine having a field winding, the combination of a current-rectifying and controlling device, connected intermediate the machine and the winding, said device being of the vapor-arc type having a make-alive element, a circuit influenced by the machine voltage for supplying an exciting current to said element during alternate half cycles of said voltage, a saturable-core reactor having an impedor winding disposed in said circuit and a core-saturating winding, and means for energizing said saturating winding by a unidirectional current, the magnitude of which varies in accordance with the load-current of said alternating-current machine.

8. In combination, a dynamo-electric machine having a field winding, an alternating-current source of power, a vapor-arc current-rectifying device, having a make-alive element, connected intermediate the power source and the field winding, a circuit influenced by the power source voltage for supplying exciting current to said make-alive element during alternate half cycles of said voltage, a saturable-core reactor having an impedor winding disposed in said circuit and a plurality of core-saturating windings, and means for energizing each saturating winding by a unidirectional current the magnitude of which varies in accordance with changes in a separate characteristic of said dynamo-electric machine.

9. In a self-excitation system for an alternating-current dynamo-electric machine having a field winding, the combination of a current-rectifying and controlling device connected intermediate the machine and the winding, said device being of the vapor-arc type having a make-alive element, a circuit influenced by the machine voltage for supplying an exciting current to said element during alternate half cycles of said voltage, a saturable-core reactor having an impedor winding disposed in said circuit and two core-saturating windings, means for energizing one of said saturating windings by a unidirectional current, the magnitude of which varies in accordance with the voltage of said machine, and means for energizing the other of said saturating windings by a unidirectional current the magnitude of which varies in accordance with the load-current of said machine.

10. In a self-excitation system for an alternating-current dynamo-electric machine having a field winding, the combination of a current rectifying and controlling device connected intermediate the machine and the winding, said device being of the vapor-arc type having a make-alive element, a circuit influenced by the machine voltage for supplying an exciting current to said element, a triode electronic tube rectifier disposed in said circuit to permit passage of exciting current to the make-alive element only during alternate half cycles of machine voltage and to modify the character of said current, and means for impressing upon said triode tube a control potential the character of which varies in accordance with changes in a characteristic of said dynamo-electric machine.

11. In a self-excitation system for an alternating-current dynamo-electric machine having a field winding, the combination of a current rectifying and controlling device connected intermediate the machine and the winding, said device being of the vapor-arc type having a make-alive element, a circuit influenced by the machine voltage for supplying an exciting current to said element, a triode electronic tube rectifier disposed in said circuit to permit passage of exciting current to the make-alive element only during alternate half cycles of machine voltage and to modify the character of said current, and means for impressing upon said triode tube a control potential the character of which varies in accordance with the voltage of said dynamo-electric machine.

12. In a self-excitation system for an alternating-current dynamo-electric machine having a field winding, the combination of a current rectifying and controlling device connected intermediate the machine and the winding, said device being of the vapor-arc type having a make-alive element, a circuit influenced by the machine voltage for supplying an exciting current to said element, a triode electronic tube rectifier disposed in said circuit to permit passage of exciting current to the make-alive element only during alternate half-cycles of machine voltage and to modify the character of said current, and means for impressing upon said triode tube a control potential the character of which varies in accordance with the load-current of said dynamo-electric machine.

13. In a self-excitation system for an alternating-current dynamo-electric machine having a field winding, the combination of a current rectifying and controlling device connected intermediate the machine and the winding, said device being of the vapor-arc type having a make-alive element, a circuit influenced by the machine voltage for supplying an exciting current to said element, a triode electronic tube rectifier disposed in said circuit to permit passage of exciting current to the make-alive element only during alternate half cycles of machine voltage and to modify the character of said current, and means for impressing upon said triode tube a control potential the character of which varies in accordance with changes in both the voltage and the load-current of said dynamo-electric machine.

14. In combination, a dynamo-electric machine having a field winding, an alternating-current source of power, a current-rectifying and controlling device connected intermediate the power source and the winding, said device being of the vapor-arc type having a plurality of make-alive elements, circuits influenced by the power source voltage for supplying exciting currents to said elements during alternate half cycles of said voltage, and means disposed in each of said circuits for controlling, in accordance with changes in a separate characteristic of said machine, the point in the said half-cycles at which the exciting current renders the respective make-alive element effective.

15. In a self-excitation system for an alternating-current dynamo-electric machine having a field winding, the combination of a current rectifying and controlling device connected intermediate the machine and the winding, said device being of the vapor-arc type having two make-alive elements, circuits for supplying exciting currents to said elements during alternate half cycles of machine voltage, means for changing the character of one of said element exciting currents in accordance with variations in the voltage of said machine, and means for changing the character of the other element exciting current in accordance with variations in the load current of said machine.

16. A vapor-arc asymmetrically conducting device for use on an alternating-current circuit, comprising a vaporizable reconstructing cathode and main anode means associated therewith, characterized by having a plurality of stationary make-alive devices of poorly-conducting material each of which has one end thereof contacting at all times with said cathode for forming a cathode spot thereon, and means for applying intermittent unidirectional energy-impulses to said devices only during the positive half-cycles of said alternating-current circuit, the character of the impulses so supplied to each device being independently determined by a separate controlling influence.

CHARLES F. WAGNER.